(No Model.)   4 Sheets—Sheet 3.
M. J. TODD.
HARROW.
No. 527,352. Patented Oct. 9, 1894.
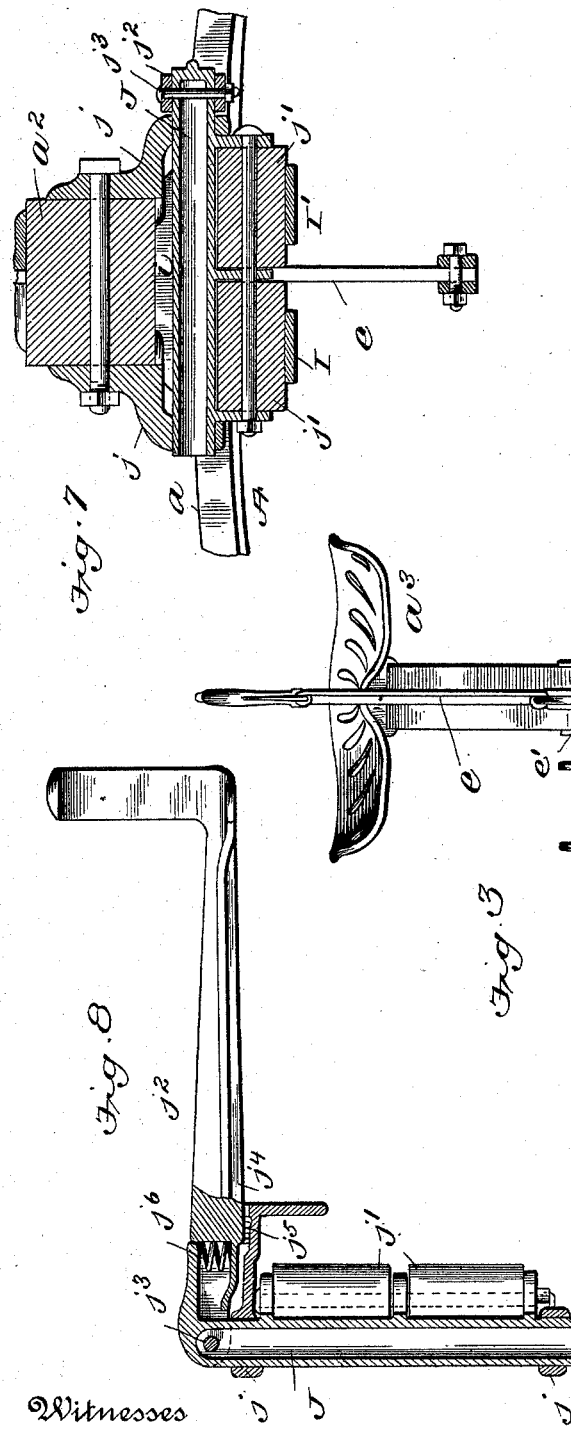
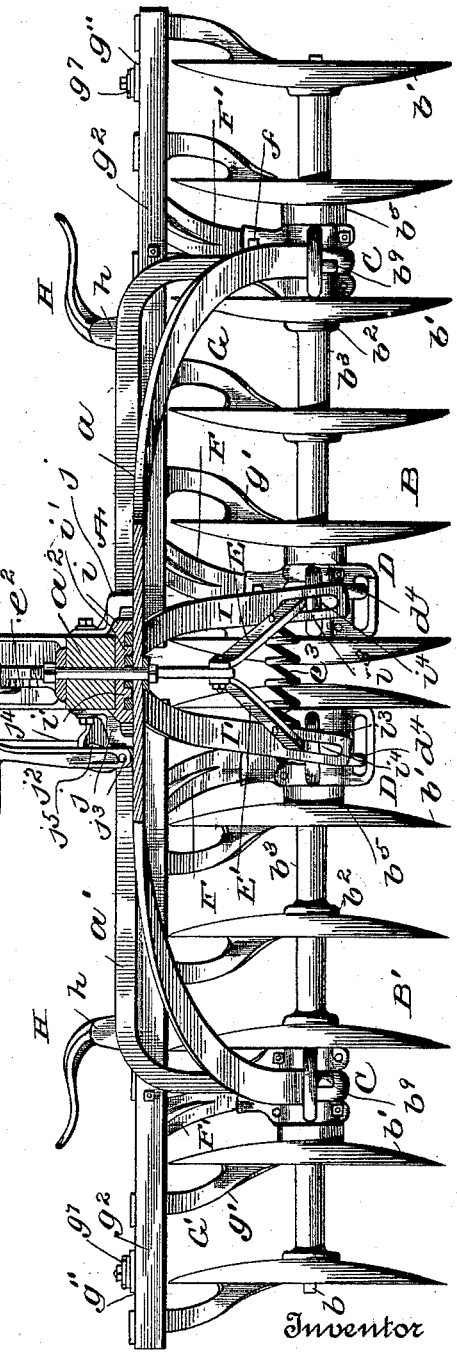
Witnesses
Inventor
Attorney

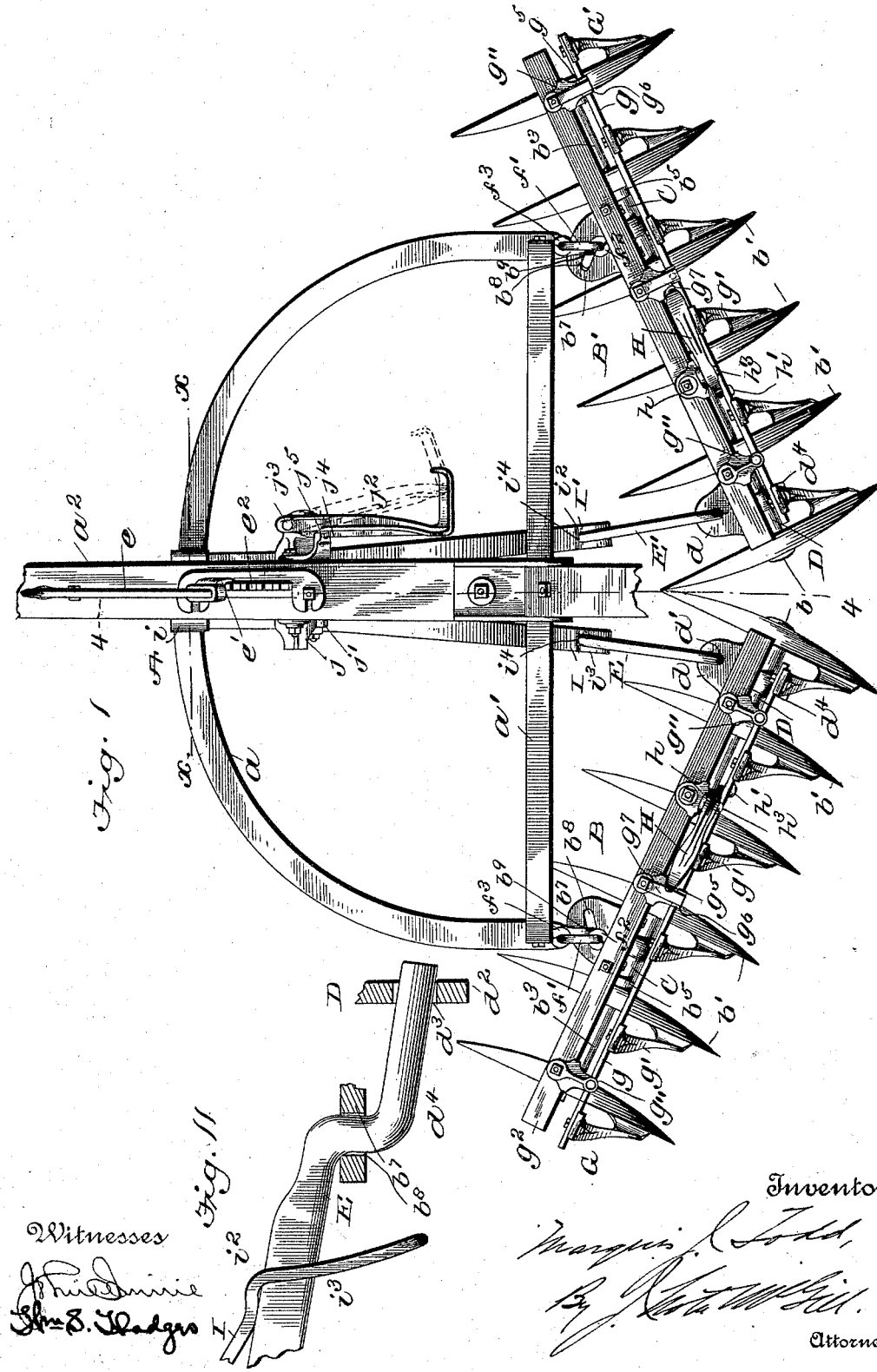

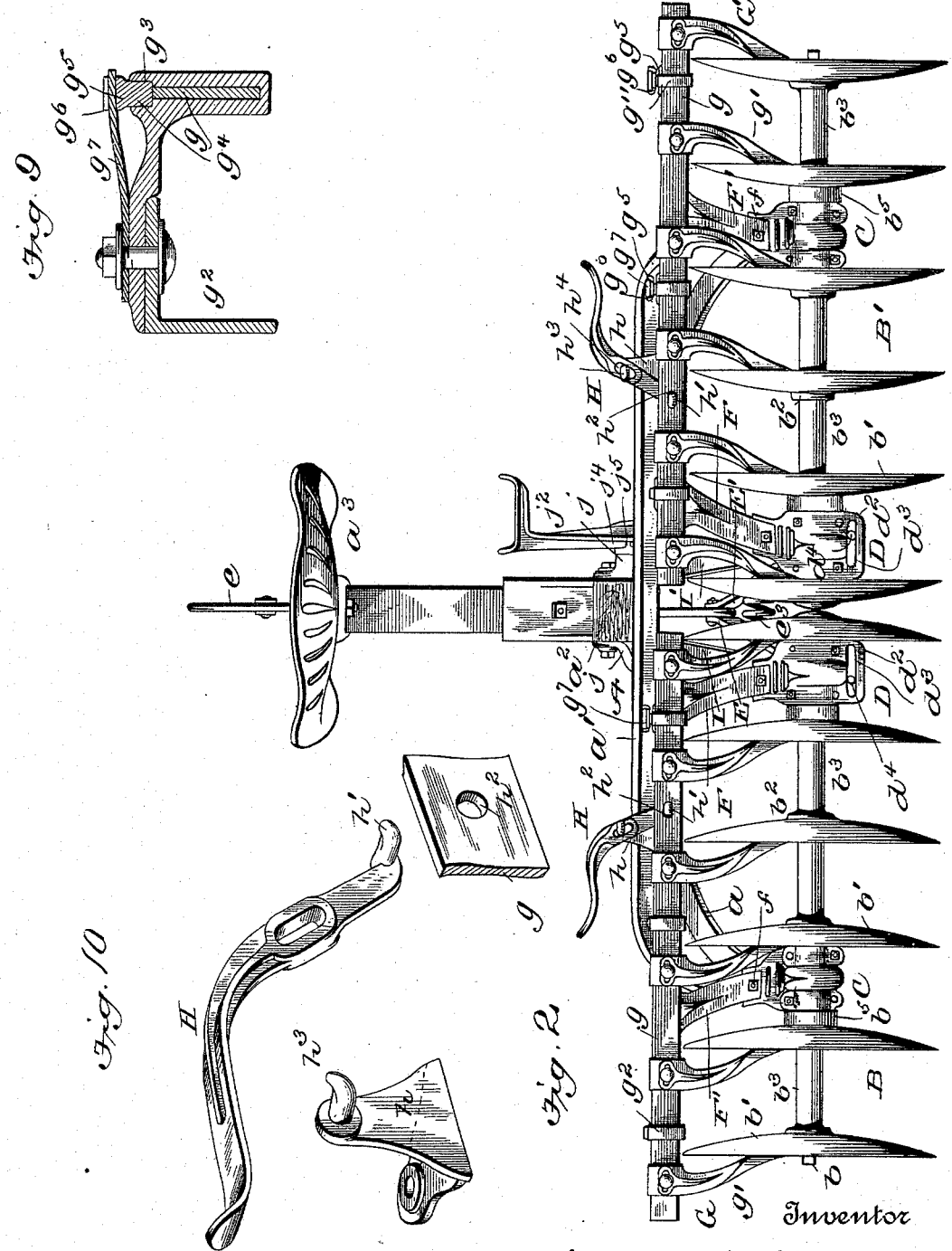

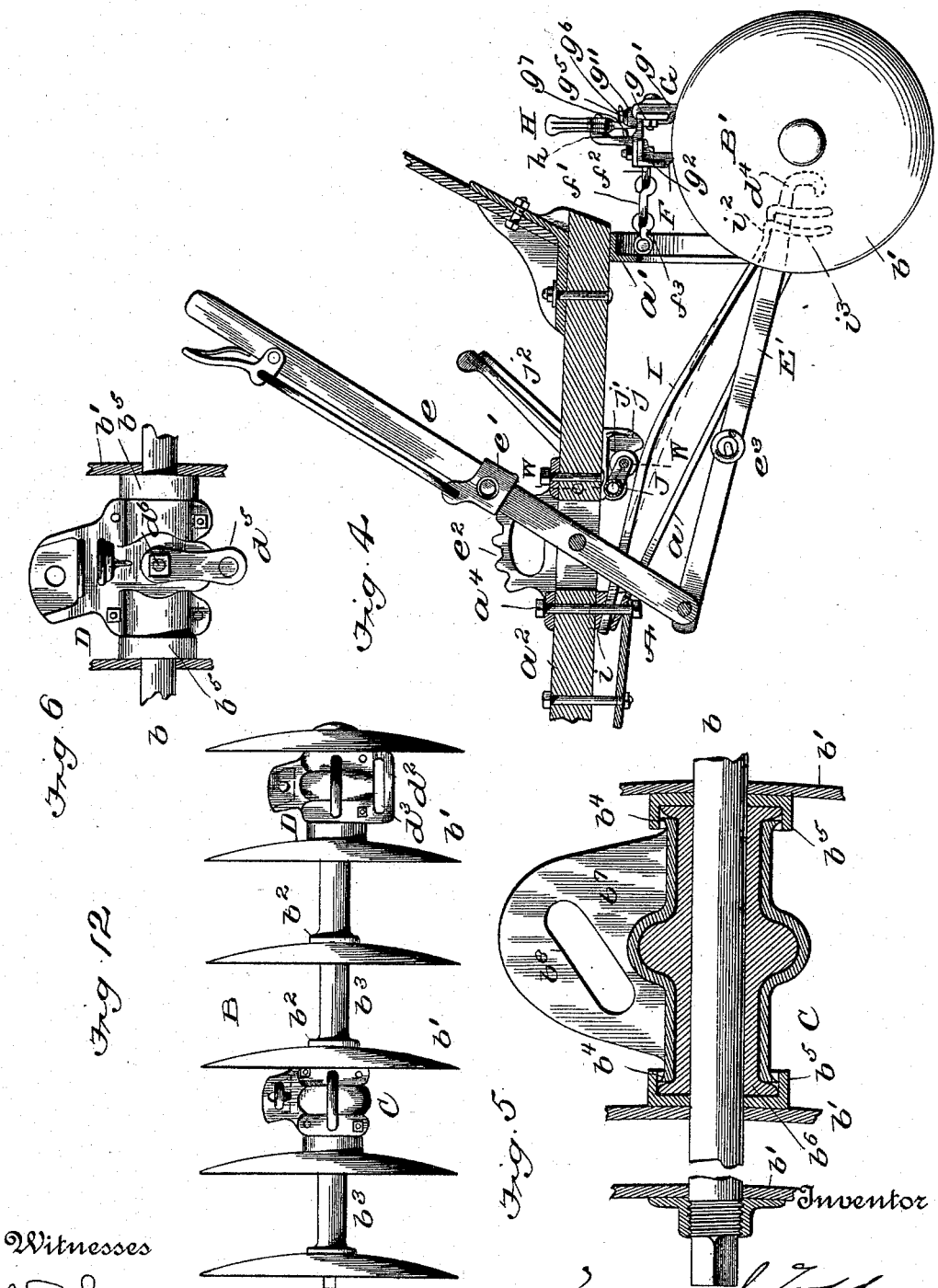

UNITED STATES PATENT OFFICE.

MARQUIS J. TODD, OF BUFFALO, NEW YORK, ASSIGNOR TO THE PITTS AGRICULTURAL WORKS, OF SAME PLACE.

HARROW.

SPECIFICATION forming part of Letters Patent No. 527,352, dated October 9, 1894.

Application filed April 7, 1894. Serial No. 506,766. (No model.)

*To all whom it may concern:*

Be it known that I, MARQUIS J. TODD, of Buffalo, in the county of Erie and State of New York, have invented certain new and useful Improvements in Harrows; and I do hereby declare the following to be a full, clear, and exact description of the invention, such as will enable others skilled in the art to which it appertains to make and use the same.

This invention contemplates certain new and useful improvements in disk-harrows, having reference to that class employing two sets or gangs of disks pivotally mounted and capable of being adjusted as to pitch or relative inclinations.

The object of the invention, primarily, is to so mount and connect the gangs that all the disks are under an equal pressure and the tendency of the gangs to constantly rise at their inner ends is successfully overcome.

A further object is to provide a disk-harrow in which each gang of disks is entirely independent of the other, whereby any deflection of one gang caused by any unevenness of the ground or contact with stones and the like, is not communicated to, nor will not interfere with, the other.

A further object is to equalize or distribute the end-thrust upon the several bearings, thus avoiding the unequal cutting or wearing of the boxings.

A further object is to so mount and connect the two gangs that the innermost disks thereof will lightly bear or rest against each other at all angles of adjustment, thus relieving the bearings from the inner end-thrust or pressure.

The invention consists of a harrow having two sets or gangs of disks connected near their outer ends to the rigid draft-frame and having means for adjusting them at their inner ends, and springs bearing on said inner ends, whereby each gang is free to rise or fall independent of the other by the yielding of said springs, and equal pressure is maintained on all the disks of the harrow.

The invention further consists of a harrow having two sets or gangs of disks provided with journal boxings or bearings, connections between said boxings or bearings and harrow-frame, springs bearing upon the inner ends of said gangs, and means for regulating the tension of said springs.

The invention further consists of a harrow having two gangs of disks provided each with an angularly slotted ear near its outer end, with which ears engages a rigid bar of the draft-frame, and ears and plates near the inner ends of said gangs having holes or openings therein for reception of the inner ends of the adjusting bars, whereby the innermost disks of the two gangs are designed to bear against or be in contact with each other at all angles of adjustment.

The invention also comprises the details of construction, combination and arrangement of parts, substantially as hereinafter fully set forth and particularly pointed out in the claims.

In the accompanying drawings:—Figure 1 is a plan view. Fig. 2 is a rear view. Fig. 3 is a front cross-sectional view taken on the line $x$—$x$, Fig. 1. Fig. 4 is a transverse sectional view on the line $y$—$y$, Fig. 1. Fig. 5 is an enlarged horizontal sectional view of one of the journal boxes. Fig. 6 is a rear view of the latter. Fig. 7 is a cross-sectional view on the line $w$—$w$, Fig. 4. Fig. 8 is an enlarged view of the crank-shaft and its foot-lever. Fig. 9 is an enlarged view of the friction clutch of the scrapers. Figs. 10 and 11 are details. Fig. 12 is a view of one of the gangs with the scrapers removed.

Referring to the drawings, A designates the draft-frame, which comprises a curved rearwardly slanting bar $a$; a yoke $a'$ having its perpendicular ends connected to said bar $a$; and a pole $a^2$ to the under side of which said bar and yoke are connected, the seat $a^3$ being secured to the rear end of said pole. The curved bar $a$ is secured to the pole by a nutted bolt $a^4$.

B, B', designate the two gangs, each of which has a central shaft $b$ upon which are mounted a series of concavo-convex disks $b'$ held between the flanged ends $b^2$ of corresponding sleeves $b^3$ fitted on said shaft. The innermost disks of the two gangs are designed to be in constant contact, and such contact is always maintained at whatever angle or pitch said gangs may be set. Between two of the disks of each gang, near the outer end thereof, is mounted a two-part boxing C having flanged ends $b^4$ over which fit cylindrical collars $b^5$ forming sand-guards. These collars are carried by the shaft $b$, and are held tight against the disks by inner sleeves $b^6$ bearing thereagainst, said sleeves conforming to the interior of the boxings. From the front of these boxings project ears $b^7$ having each an angular or inclined slot $b^8$ in which slots fit the hooked ends $b^9$ of the rigid frame-bar $a$. Between the two inner disks of each gang is a boxing D having at its front an ear $d$ provided with an eye or hole $d'$ and a rearward depending plate $d^2$ having a slot $d^3$ therein through which and the eyes in ears $d$ are passed the inner curved ends $d^4$ of two corresponding adjusting bars E, E'. In lieu of this depending slotted plate $d^2$, a pivoted pendulum-like plate $d^5$ may be substituted, as seen in Fig. 6. This plate occupies a perdendicular position and is pivoted by a bolt or stud $d^6$ extending from boxing D, the lower end of said plate having a hole therein for reception of the reduced end of the adjusting bar. By means of the described connections between the adjusting bars and the inner boxings the latter are made to maintain their proper positions. The adjusting bars E, E' converge and at their outer ends are secured to the lower end of an operating lever $e$ passed upwardly through a slot in pole $a^2$ and having an ordinary spring-catch $e'$ for engaging a toothed quadrant $e^2$ secured direct to the pole. Between the two adjusting bars, and connected thereto, is a coil-spring $e^3$ of sufficient tension to constantly bear outwardly on the said bars, whereby a portion of the end-pressure is thrown upon the inner boxes, thus relieving the pressure upon the two innermost disks.

To the boxings C and D are secured standards F, F', which fit in grooves or cut-away portions in the front faces of said boxings, the same being held therein by nutted bolts $f$. These standards form the support for the scraper frame to which the yoke $a'$ is connected by any suitable means, preferably by a link $f'$ engaging hooked bolts $f^2$, and $f^3$. When the scraper frame is dispensed with, and consequently its supporting standards, the bolts $f^2$ are secured directly to the outer boxings C.

G, G', designate two series of scrapers, each of which has a movable bar $g$ to which the scraper-arms $g'$ are directly secured, and a rigid bar $g^2$ connected to and supported by the standards F and F'. The movable bar $g$ fits snug in looped keepers $g''$ having horizontal portions bolted direct to the rigid bar $g^2$. In the tops of these keepers are holes or openings $g^3$ in any one, or each of which, is designed to fit a lug $g^4$ having an upper horizontal head $g^5$ provided with end-flanges $g^6$ between which rests one end of a spring-plate $g^7$ held at its other end by the bolt which binds the keeper to the rigid bar. The tension of this spring or springs is such as to bind the lug $g^4$ tight upon the upper horizontal edge of the movable bar $g$. In this way the scrapers are firmly held at any point to which adjusted by the inner or outward movement of the bar $g$. To effect this movement of said bar, each set of scrapers is provided with a lever H, fullcrumed on a post $h$ secured to bar $g^2$ and engaging the movable bar. The lower end of the lever is bent outwardly to form a lug $h'$, the extreme end of which is bent at right angles, whereby said end of the lever can be inserted through a slot $h^2$ in bar $g$. The post $h$ is provided with a similar flanged lug $h^3$ which is designed to extend through a slot $h^4$ in the lever. In this way I dispense with the use of screws and nutted bolts. The extreme upper end of lever H is bent to receive the foot of the operator. By operating this lever the positions of the scrapers can be readily controlled. When it is desired to dispense with the use of the scrapers, or to construct the harrow without the same, the standards F, F', are not necessary and if previously in use can be readily removed.

As before stated the pitch or relative positions of the two gangs of disks are controlled by the operating lever $e$ and the adjusting bars E, E', leading therefrom to the inner ends of said gangs.

I, I' indicate two plate-springs which are slightly bowed and rigidly held at their forward upper ends between the curved draft-bar $a$ and pole $a^2$, preferably, by an interposed plate $i$ having upper and lower end-flanges and depending lugs or studs $i'$ fitting in holes in said spring. By tightening up the nutted bolt $a^4$ the plate $i$ will be firmly bound, its upper end-flanges hugging the sides of the pole and its lower beveled flanges resting upon the top of the draft-frame bar $a$. These springs at their rear, lower ends are bent or curved inward as at $i^2$ and thence downwardly, as at $i^3$, in which latter portions are formed slots $i^4$ through which the adjusting bars E, E', are passed, the curved portions $i^2$ of said springs bearing constantly upon the upper edges of said bars. The tension of the springs is such that the inner ends of the gangs are allowed to rise and fall to conform to any unevenness of the ground and at the same time maintain an equal pressure on all the disks at whatever angle or inclination the gangs may assume. To regulate the degree of pressure or tension of the springs any suitable means may be employed, but I prefer a crank-shaft J mounted in bearings $j$ secued to the pole and having rollers $j'$ thereon which constantly bear upon said springs. This crank-shaft enables me to obtain a wedge-like action in forcing down the springs to increase the tension on the inner ends of the gangs. One end of this crank-shaft is bent at right angles and fits snug in a groove in the side of a foot lever $j^2$ pivoted at $j^3$ to said crank-shaft. A side-web or tooth $j^4$ of this foot-lever is normally held in engagement with any one of a curved series of teeth $j^5$ formed with one of the shaft-bearings $j$, by means of a coil-spring $j^6$ which presses the lever inward toward the poles. The operator in order to tighten the tension of the springs first presses outwardly on the outer end of this foot-lever $j^2$ disengaging the same from the teeth $j^5$ and then forces the same downward, causing the rollers of the crank-shaft to bear down upon the springs. When the proper tension has been obtained, the operator releases the outward pressure on the lever and the coil-spring $j^6$ forces the same into engagement with the series of teeth. The tensions of these springs I, I', serve to aid the operator in changing the positions of the two gangs, that is, in bringing the inner ends thereof forward by moving the lever rearward, the action of said springs on the operating bars tending to force the latter forward.

From what has been said it will be seen that both gangs are pivotally mounted in position and each is independent of the other; that the raising or deflection of either gang by reason of contact with a stone or other obstruction or on account of inclination of the ground will not be communicated to the other gang, and hence the position of one gang in no way affects or alters the position of the other beyond the relative pitch given to both gangs by the operating lever and adjusting bars. It will also be seen that the connections between the gangs and the draft-frame serve to relieve the pressure upon the innermost disks, and the angular slots in the outer ears receive a portion of the end-thrust in the forward action of the draft, the hooked ends of the rigid bar binding against their inclined faces in such way that the tendency is to force outward the boxings or bearings of each gang. The inner thrust or movement is limited by contact of the inner disks and the pressure on the latter is relieved by the angularly slotted ears engaged by the draft-frame, and the spring-pressure between the adjusting bars.

The advantage of the spring-pressure on the inner ends of the gangs lies not only in the fact that it relieves such inner ends in overcoming stones or other obstructions but serves to fully obviate or overcome any tendency of the gangs at their inner ends to rise when thrown in their working positions, thereby putting an equal pressure on every disk in the harrow while at work, and this at the will of the operator. The action of the spring between the two adjusting bars constantly bearing outwardly on the two gangs, tends to force the latter apart causing the inner boxes to receive a portion of the end-thrust thus relieving the innermost disks.

I claim as my invention—

1. A harrow having its draft-frame provided with a rigid-bar, two gangs of disks bearing near their outer ends angularly slotted ears to which the ends of said bar are connected, ears and plates near the inner ends of said gangs having holes or openings therein, and the adjusting bars having their ends passed through said holes or openings of said ears and plates, substantially as set forth.

2. A harrow having its draft-frame provided with a rigid bar, two gangs of disks bearing near their outer ends forwardly projecting ears provided with angular slots in which fit the hooked ends of said rigid bar, forwardly projecting ears at or near the inner ends of said gangs having holes or openings, plates on the rear of said gangs having openings therein, and adjusting bars having their ends passed through said openings of said latter ears and plates, substantially as set forth.

3. A harrow having two pivotally mounted gangs of disks, means connected to the inner ends of said gangs for adjusting the latter, and independent springs for bearing down the said inner ends of said gangs, substantially as set forth.

4. A harrow having two pivotally mounted gangs of disks, adjusting bars connected to said gangs at or near their inner ends, and independent springs bearing downwardly upon said bars at or near their connections to said gangs, substantially as set forth.

5. A harrow having two pivotally-mounted gangs of disks, adjusting bars connected to said gangs at or near their inner ends, springs bearing upon said bars, and means for regulating the tensions of said springs, substantially as set forth.

6. A harrow having two pivotally-mounted gangs of disks, adjusting bars connected to said gangs at or near their inner ends, springs bearing downwardly upon said bars, a crank-shaft bearing upon said springs, and means for holding the same at any point of adjustment, substantially as set forth.

7. A harrow having two pivotally-mounted gangs of disks, adjusting bars connected to said gangs at or near the inner ends thereof, two plate-springs located over said bars and having bent or curved portions constantly held in contact with said bars, and means for adjusting the tension of said springs, substantially as set forth.

8. A harrow having two pivotally-mounted gangs of disks, adjusting bars connected to said gangs at or near the inner ends thereof, two plate-springs having bent ends provided with slots through which said bars are passed, said springs having inwardly extended portions bearing upon said bars, substantially as set forth.

9. A harrow having its draft-frame provided with a rigid-bar, two gangs of disks having angularly slotted ears near their outer ends engaged by said rigid bar, two adjusting bars connected to said gangs at or near their inner ends, and a spring located between said adjusting bars and bearing outwardly thereon, substantially as set forth.

10. A harrow having two pivotally mounted gangs of disks, adjusting bars connected to said gangs at or near the inner ends thereof, two plate-springs secured at their outer ends and having inwardly bent portions at their inner ends, said latter ends having slots through which said bars project, and a tension regulator bearing on said springs near their secured ends, substantially as set forth.

11. A harrow having two pivotally mounted gangs of disks, adjusting bars connected to said gangs at or near the inner ends thereof, two plate-springs secured at their outer ends and having inwardly bent portions at their inner ends, said latter ends having slots therein through which said bars project, a crank-shaft designed to bear on said springs at or near their secured ends, and means for adjusting and holding said crank-shaft, substantially as set forth.

12. In a harrow, the combination with the draft-frame and the pole, said frame having a rigid bar provided with hooked ends, of the two gangs of disks having ears near their outer ends provided with angular slots therein for reception of the said hooked ends of said bar, and the ears and plates also extending from said gangs near the inner ends thereof, said ears and plates having openings therein, the adjusting bars having their inner ends extended through the said openings of said ears and plates, the plate-springs secured at their forward ends to said draft-frame and bearing upon said adjusting bars at or near the lower ends of the latter, and a crank-shaft for engaging said springs near their secured ends, substantially as set forth.

13. The combination with the draft-frame, and the two gangs of disks pivotally connected thereto, of the adjusting bars connected to the inner ends of said gangs, the plate-springs secured at their outer ends to said draft-frame and having inner slotted bent ends through which said bars project, and the crank-shaft having rollers thereon designed to bear upon said springs, substantially as set forth.

14. The combination with the draft-frame, the gangs of disks, and the adjusting bars, of the springs bearing on said bars, the crank-shaft designed to bear upon said springs, the foot-lever fulcrumed to said crank-shaft, the toothed quadrant, and means for normally holding said foot lever in engagement with said quadrant, substantially as set forth.

15. The combination with the draft-frame, the gangs of disks, and the adjusting bars, of the springs bearing on said bars, the crank-shaft designed to bear upon said springs and having an outer angular end, the foot lever fulcrumed on said crank-shaft and having a side recess to accommodate said angular end, an interposed spring normally forcing said lever inward, and the quadrant designed to be engaged by said lever, substantially as set forth.

16. In a disk-harrow having an upper frame, a series of scrapers, a movable bar loosely held to said frame and to which said scrapers are connected, and a spring or springs for binding said movable bar and holding the same at any point to which adjusted, substantially as set forth.

17. In a disk-harrow having an upper frame, a series of scrapers, a movable bar loosely held to said frame and to which said scrapers are connected, and a frictional clutch for binding said bar at any point to which adjusted, the same comprising a spring and an inner member held by said spring tight against said movable bar, substantially as set forth.

18. In a disk harrow, having an upper frame, a series of scrapers having a bar loosely connected to said frame, means for adjusting said bar, and a spring-pressed lug or lugs designed to bear upon and hold said bar at any point to which adjusted, substantially as set forth.

19. In a disk-harrow having an upper frame, a series of keeper-plates secured to said frame having openings therein a series of scrapers having a bar movable in said keeper-plates, a lug located in said opening of said keeper-plates, and a spring bearing on said lug, substantially as set forth.

20. In a disk-harrow, having an upper frame, a series of keeper-plates secured to said frame having openings therein, a series of scrapers having a bar movable in said keeper-plates, a lug located in said opening and having a head flanged at its ends, and a plate-spring secured at one end, its free end bearing on said head of said lug and fitting between said end-flanges, substantially as set forth.

In testimony whereof I have signed this specification in the presence of two subscribing witnesses.

MARQUIS J. TODD.

Witnesses:
  J. NOTA MCGILL,
  WM. S. HODGES.